United States Patent
Frenzel

(10) Patent No.: US 9,104,372 B2
(45) Date of Patent: Aug. 11, 2015

(54) MULTIPLE FOOTPRINT STAND FOR A TABLET COMPUTER

(71) Applicant: Berend Frenzel, Basel (CH)

(72) Inventor: Berend Frenzel, Basel (CH)

( * ) Notice: Subject to any disclaimer, the term of this patent is extended or adjusted under 35 U.S.C. 154(b) by 53 days.

(21) Appl. No.: 13/781,046

(22) Filed: Feb. 28, 2013

(65) Prior Publication Data

US 2014/0239142 A1    Aug. 28, 2014

(51) Int. Cl.
| | |
|---|---|
| *G06F 1/16* | (2006.01) |
| *H05K 5/00* | (2006.01) |
| *H05K 7/00* | (2006.01) |
| *F16M 13/00* | (2006.01) |
| *F16M 11/04* | (2006.01) |
| *F16M 11/10* | (2006.01) |
| *F16M 11/38* | (2006.01) |
| *F16M 13/02* | (2006.01) |

(52) U.S. Cl.
CPC ............ *G06F 1/1632* (2013.01); *F16M 11/041* (2013.01); *F16M 11/10* (2013.01); *F16M 11/38* (2013.01); *F16M 13/00* (2013.01); *F16M 13/02* (2013.01); *F16M 13/022* (2013.01); *G06F 1/1613* (2013.01)

(58) Field of Classification Search
USPC ......... 248/453, 133, 137, 139, 176.1, 346.01, 248/346.03, 346.04, 447, 447.1, 451, 454, 248/455, 457, 473, 174, 919, 921, 922, 248/923; 361/679.06, 679.21, 679.26, 361/679.3, 679.59
See application file for complete search history.

(56) References Cited

U.S. PATENT DOCUMENTS

| | | | | |
|---|---|---|---|---|
| 719,386 | A | * | 1/1903 | Smith ........................... 248/451 |
| 2,062,553 | A | * | 12/1936 | Campos ........................ 248/453 |
| 2,662,333 | A | * | 12/1953 | Bargen .......................... 248/455 |
| 3,376,009 | A | | 4/1968 | Domino |
| 5,915,661 | A | | 6/1999 | Silverman et al. |
| 6,411,271 | B1 | * | 6/2002 | Bang et al. ....................... 345/87 |
| 6,543,734 | B2 | * | 4/2003 | Yeh ............................ 248/291.1 |
| 6,676,100 | B2 | * | 1/2004 | Hsu ............................... 248/452 |
| 7,216,445 | B2 | * | 5/2007 | Bruegmann ............... 40/606.15 |
| 7,245,481 | B2 | * | 7/2007 | Shimizu et al. .......... 361/679.08 |
| 7,487,940 | B2 | * | 2/2009 | Saez et al. ................... 248/176.1 |
| 7,735,644 | B2 | * | 6/2010 | Sirichai et al. ................ 206/320 |
| 7,926,429 | B2 | * | 4/2011 | Wu ................................ 108/43 |
| 8,132,670 | B1 | * | 3/2012 | Chen ............................. 206/320 |
| 8,220,759 | B2 | * | 7/2012 | Shimotoso .................... 248/133 |

(Continued)

FOREIGN PATENT DOCUMENTS

| | | |
|---|---|---|
| DE | 202011105156 | 1/2012 |
| DE | 202012007744 | 1/2013 |

OTHER PUBLICATIONS

Chaise Universal Tablet Stand by Kensington, 2012.

(Continued)

*Primary Examiner* — Terrell McKinnon
*Assistant Examiner* — Michael McDuffie
(74) *Attorney, Agent, or Firm* — Schiff Hardin LLP

(57) ABSTRACT

In a tablet computer stand for supporting a computer shaped as a tablet on a support surface, at least first and second footprints joined at an angle are provided. At a front end of the first footprint, a receiving surface is provided receiving an end of the tablet to support the tablet on the stand. The footprints are dimensioned and positioned relative to the tablet end receiving surface such that the stand with the tablet thereon is stable when either the first or the second footprint is resting on said support surface.

23 Claims, 10 Drawing Sheets

(56) References Cited

U.S. PATENT DOCUMENTS

| | | | |
|---|---|---|---|
| 8,344,836 B2 | 1/2013 | Lauder et al. | |
| 8,413,943 B1* | 4/2013 | Li | 248/454 |
| D684,630 S * | 6/2013 | Pham | D19/91 |
| 8,625,304 B2* | 1/2014 | Shen et al. | 361/809 |
| 8,746,446 B2* | 6/2014 | Chiang | 206/320 |
| 2004/0240164 A1* | 12/2004 | Lee | 361/683 |
| 2008/0265121 A1* | 10/2008 | Drew et al. | 248/447 |
| 2010/0122924 A1* | 5/2010 | Andrews | 206/320 |
| 2010/0315768 A1* | 12/2010 | Green | 361/679.21 |
| 2011/0286171 A1* | 11/2011 | Franz et al. | 361/679.21 |
| 2011/0290687 A1* | 12/2011 | Han | 206/320 |
| 2011/0297566 A1* | 12/2011 | Gallagher et al. | 206/320 |
| 2012/0001041 A1* | 1/2012 | Yang et al. | 248/219.4 |
| 2012/0091298 A1* | 4/2012 | Huang | 248/176.1 |
| 2013/0134282 A1* | 5/2013 | Negretti | 248/450 |
| 2013/0175426 A1* | 7/2013 | Harjani et al. | 248/688 |

OTHER PUBLICATIONS

Magnus by Ten One Design, 2012.
Boomerang by Xvida, 2012.
Tablet Holding Arm, 2012.
H4 Holder by Luxa2, 2012.
Compas Mobile Stand by Twelvesouth, 2012.
Smar Cover Leder Etui by Case and More, 2012.
HexaPose by Innopocket, 2012.
Leather Case by iOffer, 2012.
Joule by Element Case, 2012.
Luxa H4 Holder, 2012.
Slide by Just Mobile, 2012.
Nest by Bluelounge, 2012.
Smart Cover by Apple Inc., 2012.
@Rest by Heckler Design, 2012.
Block 22 by Sherwood Meister, 2012.
iPad Recliner by Lap Works, 2012.
P2 by Eleago Design, 2012.
Facet Pyramid by iLovehandles, 2012.
Wooden iPad Stand by Fel Tu, 2012.
A-Frame by Griffin, 2012.
Book Arc by Twelvesouth, 2012.
Up Stand by Just Mobile, 2012.
Stump Stand, 2012.
Chef Stand by Belkin, 2012.
Infinite Loop Stand by Infinitloop, 2012.
iPad Halter Serie XF3 Padholder, 2012.
Mobile Stand for iPad by humantoolz, 2012.
Multi Angle Acrylic Desktop Stand by iStyleCity, 2012.
SGP Case Rotate by Element Case, 2012.
iPad Security Display Stand by Yomo Security Display Co., Ltd, 2012.
Up-4 Stand by Gadget Kingdom, 2012.
Peacock Stand for Tablets, 2012.
2A Wire Display Stand by Gibson Holders, 2012.
Pad Pivot by Uifit, 2012.
iRest by Raindesign inc., 2012.
Loop by Griffin, 2012.
Mona by brisbin, 2012.
Desktop Chair by Moku Woodware, 2012.
Portable Folding Stand, 2012.
A-Fold by wohnbedarf, 2012.
Miniot Wood Mkt by Miniot, 2012.
Skadoosh Flip Stand by Jadu Industries, 2012.
Camp Fire by X-Doria, 2012.

* cited by examiner

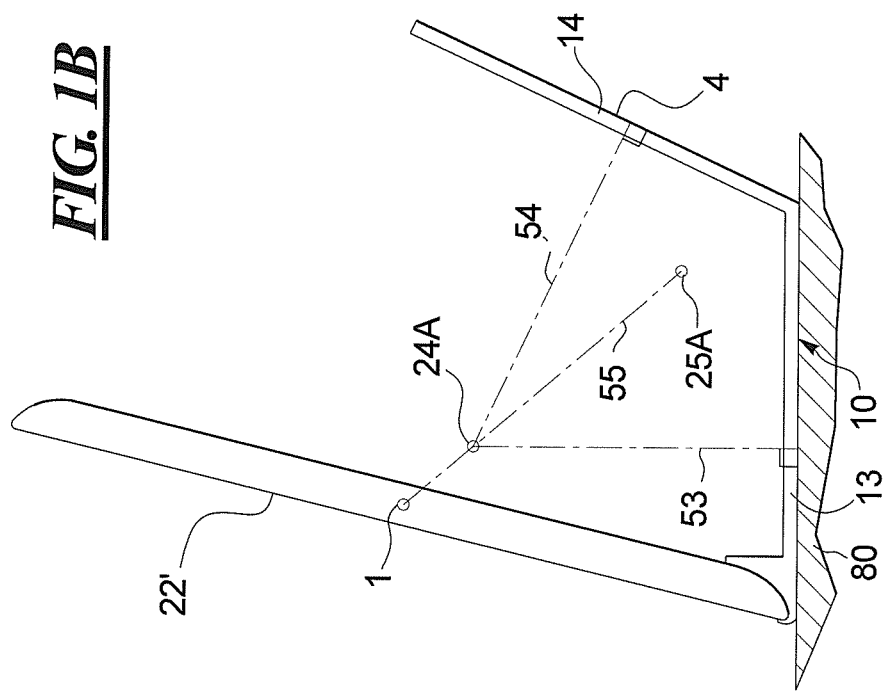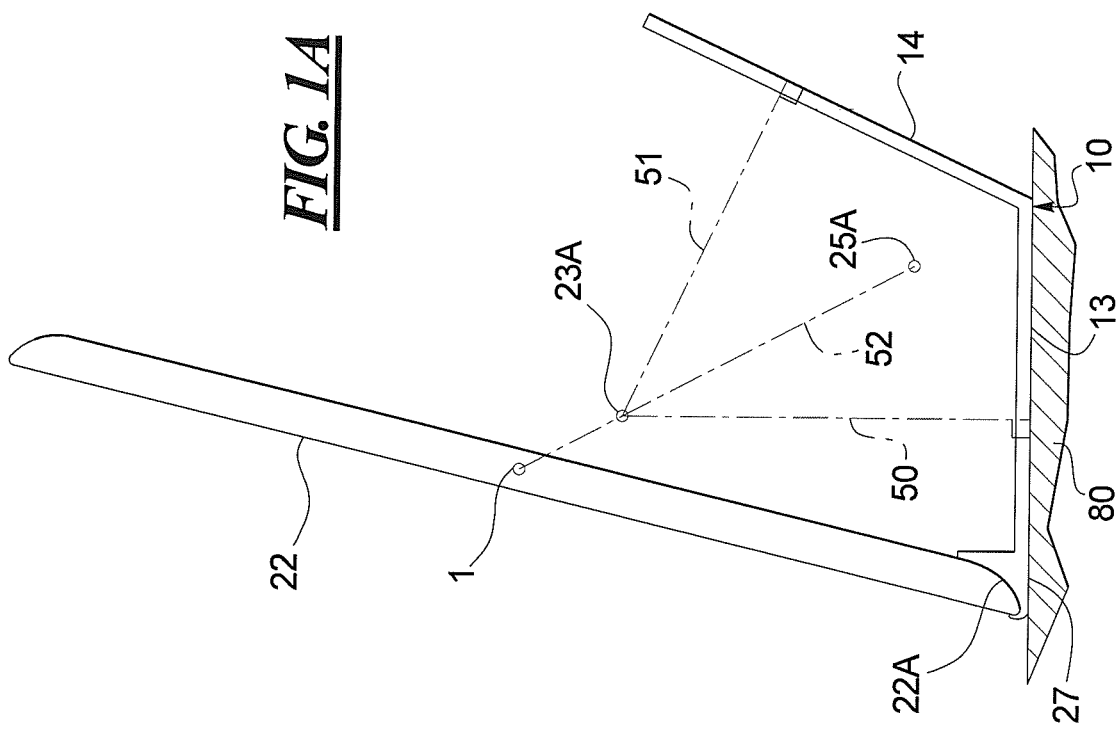

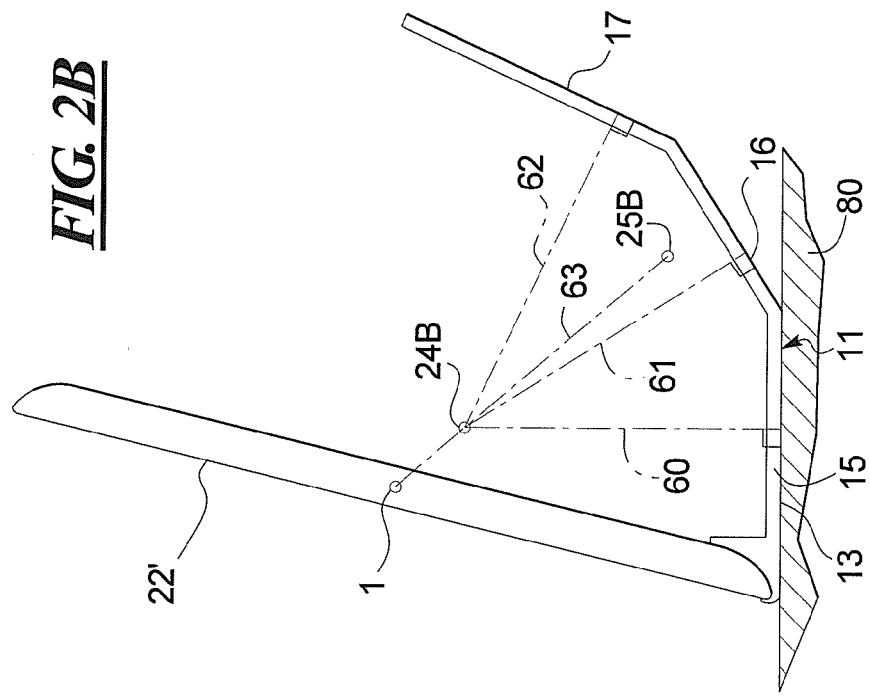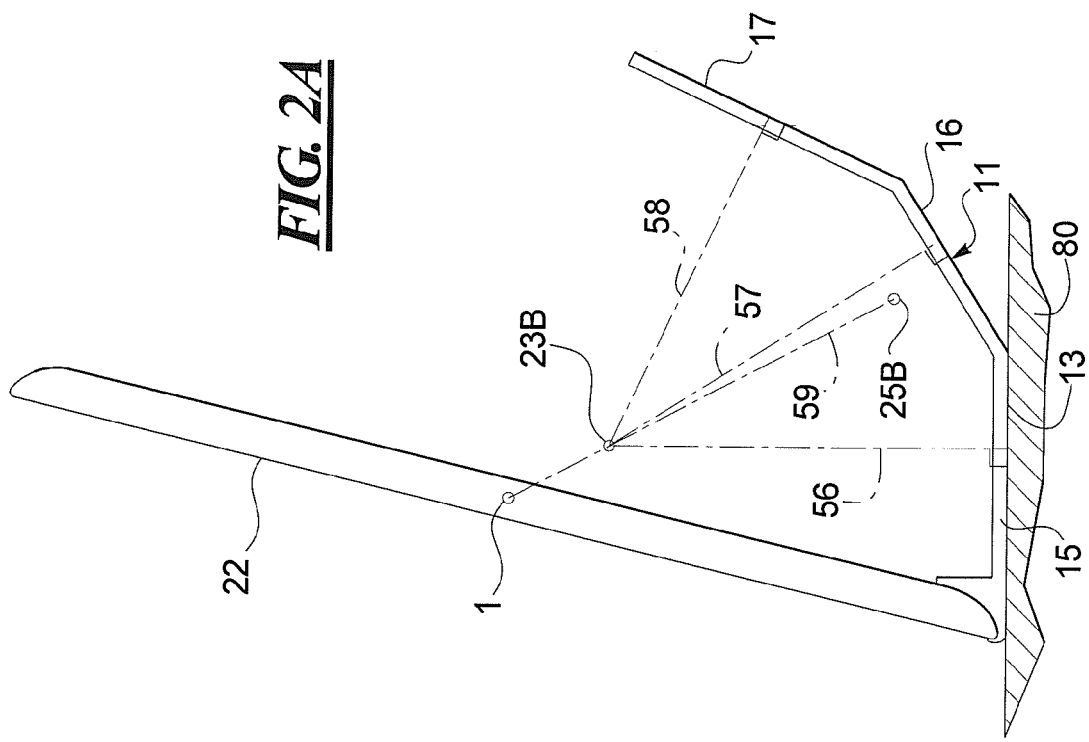

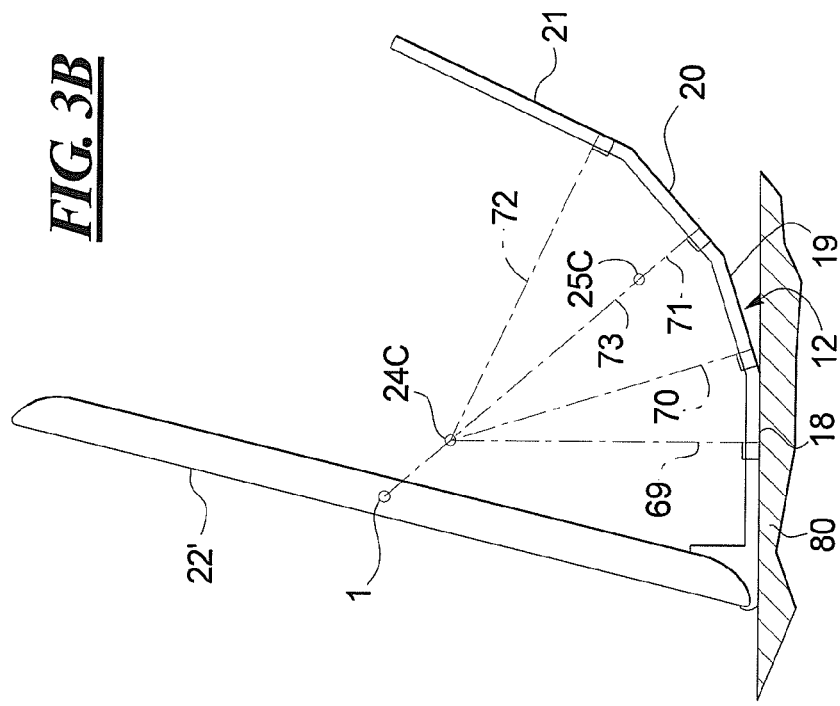
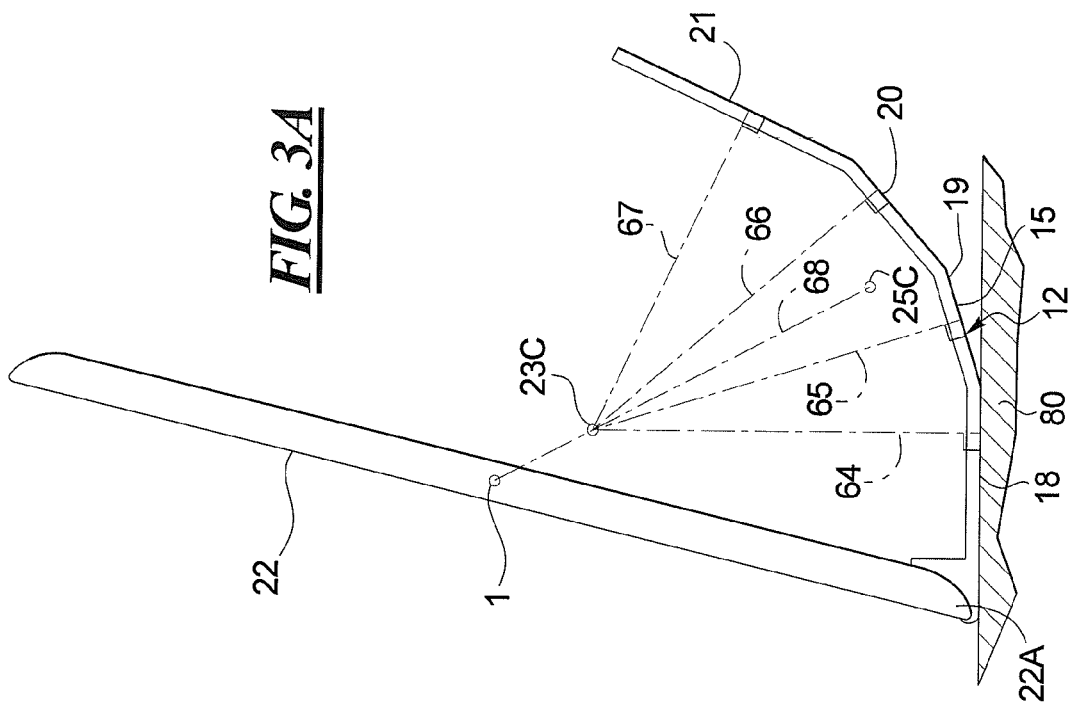

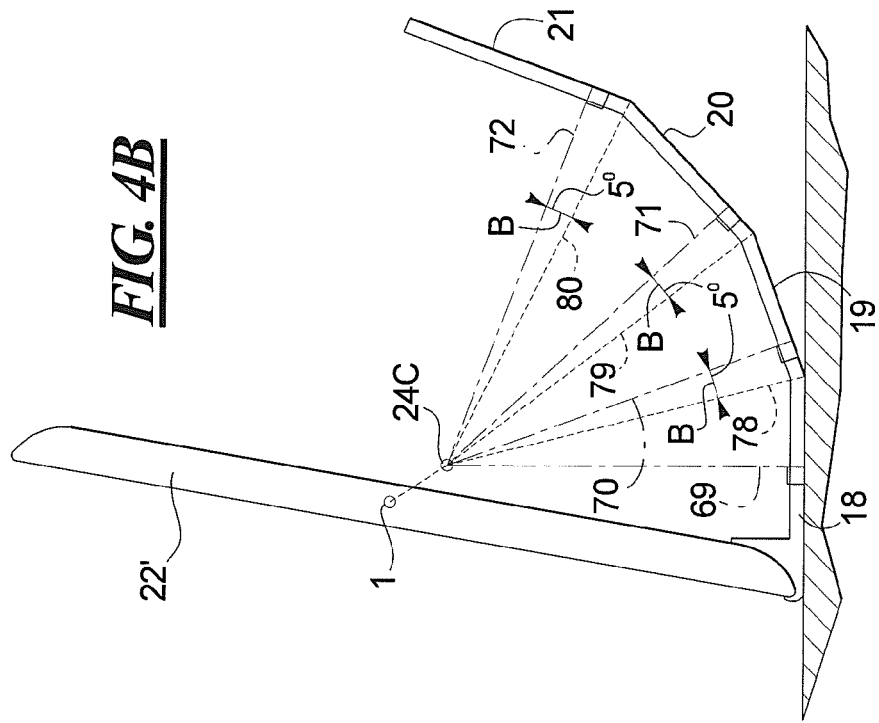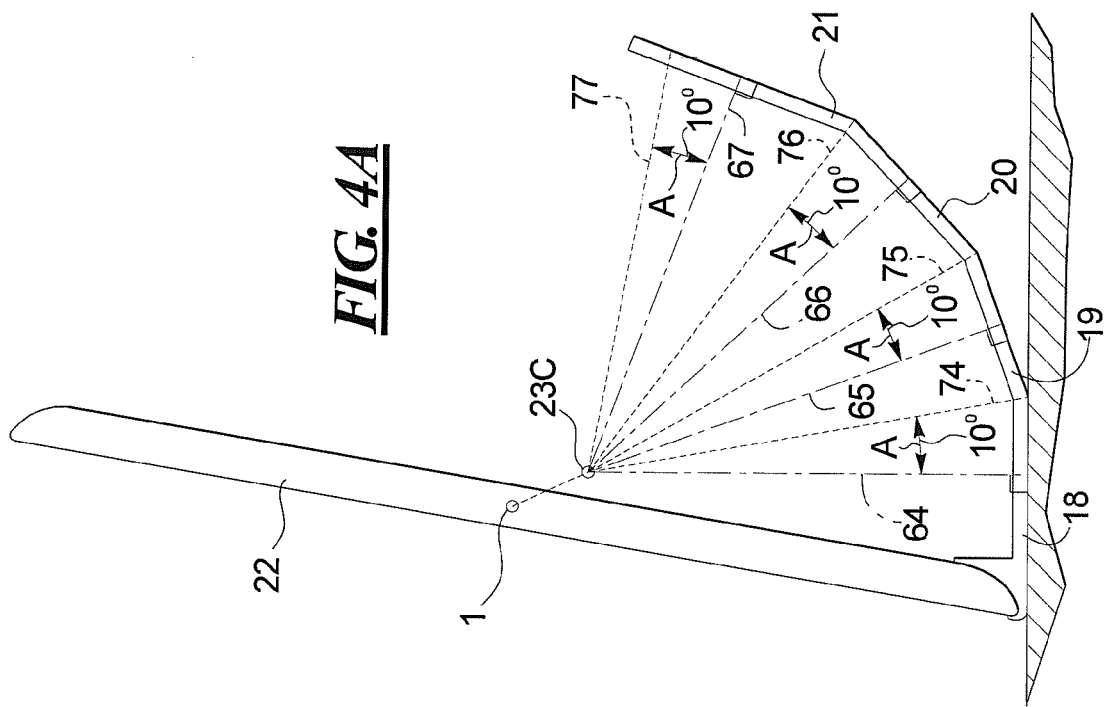

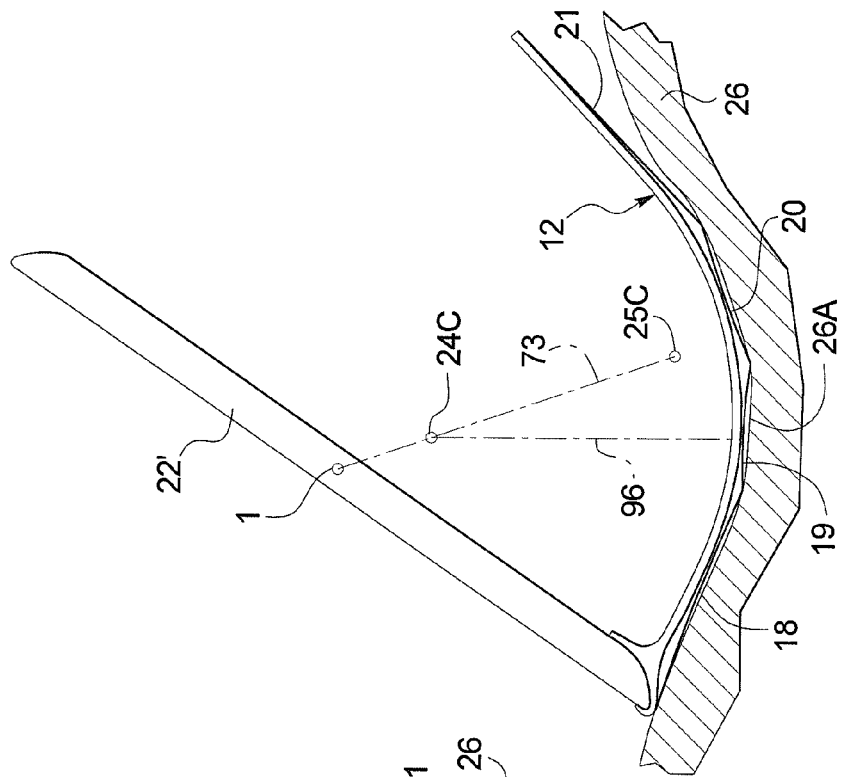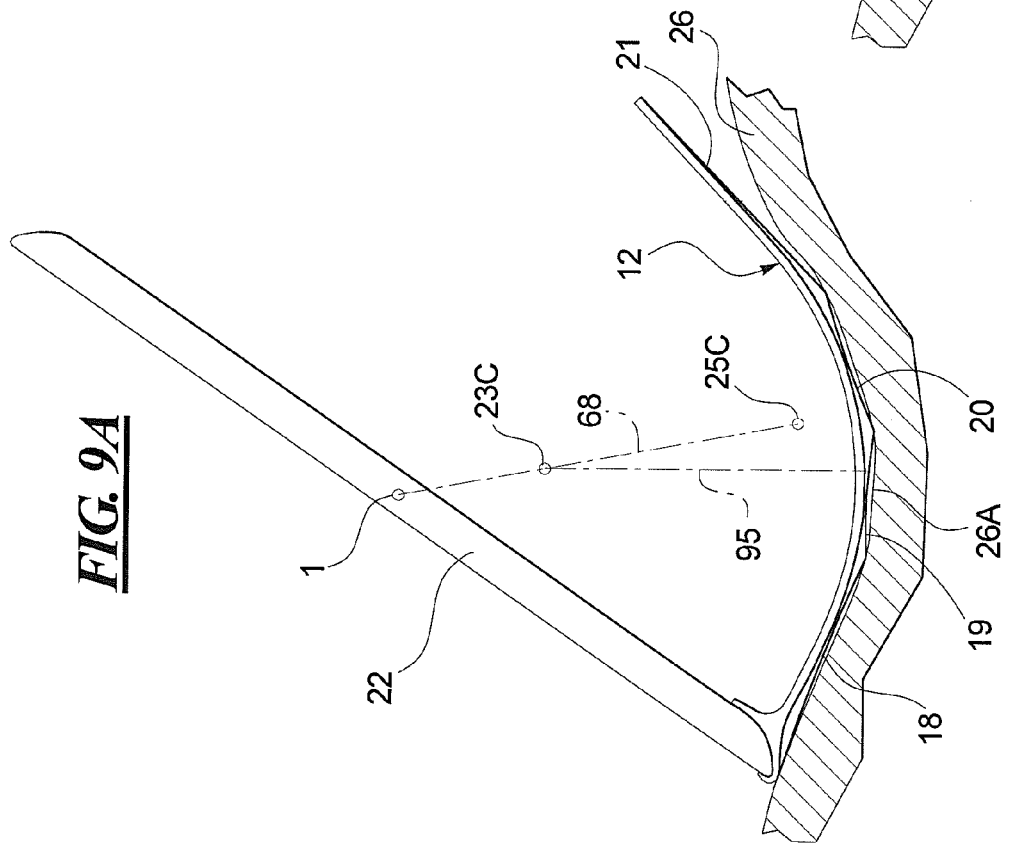

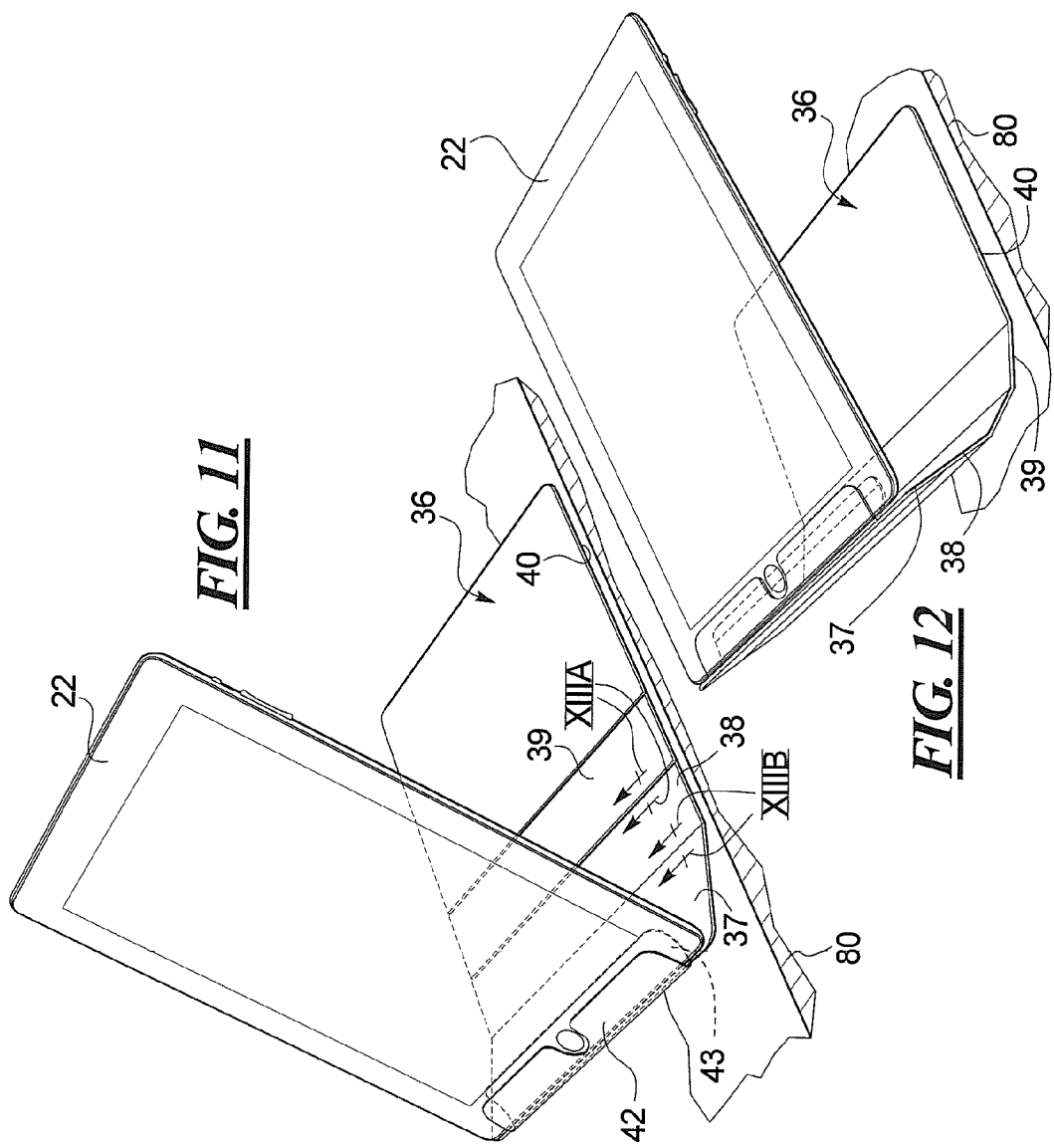
FIG. 11
FIG. 12
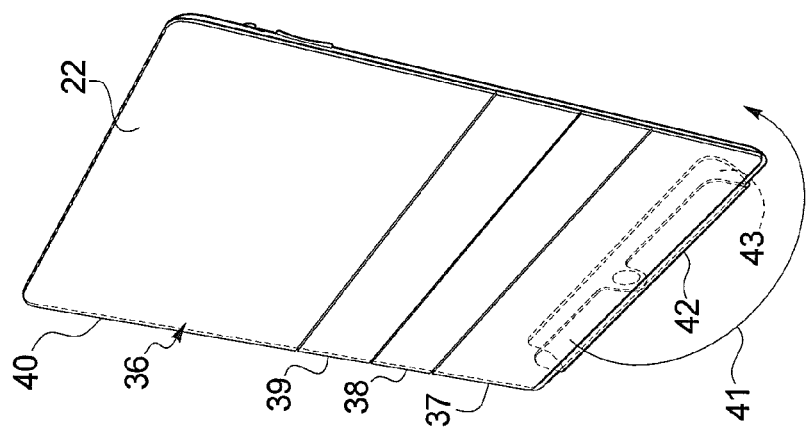
FIG. 10

MULTIPLE FOOTPRINT STAND FOR A TABLET COMPUTER

BACKGROUND

Tablet computers, or simply tablets, enjoy more and more popularity as sales figures of recent years show, and will probably play an even bigger role in the near future. Examples of such prior art tablets are the "iPad" and "iPad mini" by Apple, "Kindle" by Amazon, "Slate" by Hewlett-Packard, "Iconia" by Acer, "XPS 10" by Dell, "Ideatab" and "Thinkpad" by Lenovo, "Galaxy Tab" by Samsung, and "EeeSlate" by Asus. Minimal slim design, simplicity, and light weight are principal aspects that make the tablets extremely mobile and therefore attractive. Nevertheless, the handling and support for the actual use of these devices is not solved and even offered by their design. It is necessary to use an additional device for handling and support.

Support devices in the prior art are principally the following design types:
- One-piece stands that offer one position with a fixed viewing angle, mostly for horizontal and vertical formats. Some of the stands offer additional angles by changing the position on the same stand. One thing they all have in common is having only one single footprint.
- Multipartite stands with adaption mechanisms offer a variety of viewing angles and mostly function with retaining elements on the back.

SUMMARY

It is an object to provide an improved stand for a tablet computer.

In a tablet computer stand for supporting a computer shaped as a tablet on a support surface, at least first and second footprints joined at an angle are provided. At a front end of the first footprint, a receiving surface is provided receiving an end of the tablet to support the tablet on the stand. The footprints are dimensioned and positioned relative to the tablet end receiving surface such that the stand with the tablet thereon is stable when either the first or the second footprint is resting on said support surface.

BRIEF DESCRIPTION OF THE DRAWINGS

FIG. 1A shows a stand with two footprints for two possible viewing angles with a tablet in a vertical position;

FIG. 1B shows the two footprint stand but with the tablet in a horizontal position;

FIG. 2A shows a stand with three footprints for three possible viewing angles with a tablet in a vertical position;

FIG. 2B shows the three footprint stand but with the tablet in a horizontal position;

FIG. 3A shows a stand with four footprints for four possible viewing angles with a tablet in a vertical position;

FIG. 3B shows the four footprint stand but with the tablet in a horizontal position;

FIG. 4A is a side view of the stand of FIG. 3A with the tablet in the vertical position and showing a minimum angle between a stable position and when the stand starts to tilt to a next or a previous footprint;

FIG. 4B is a side view of the stand of FIG. 3B with the tablet in the horizontal position and showing a minimum angle between a stable position and when the stand starts to tilt to a next or a previous footprint;

FIG. 9A is a side view of the four footprint stand of FIG. 3A with a vertically positioned tablet resting on a soft support surface like a duvet or pillow;

FIG. 9B is a side view of the stand of FIG. 3B with the tablet positioned horizontally on the duvet or pillow shown in FIG. 9A;

FIG. 10 is a four footprint flexible cover stand with a vertically positioned tablet with a cover in a closed position overlying a display screen of a tablet;

FIG. 11 is a perspective view of the flexible cover stand of FIG. 10 but with the cover in a second position and resting on a second footprint;

FIG. 12 is a perspective view of the flexible cover stand of FIG. 10 in the open position and resting on a fourth footprint;

DESCRIPTION OF PREFERRED EXEMPLARY EMBODIMENTS

Figure 5:
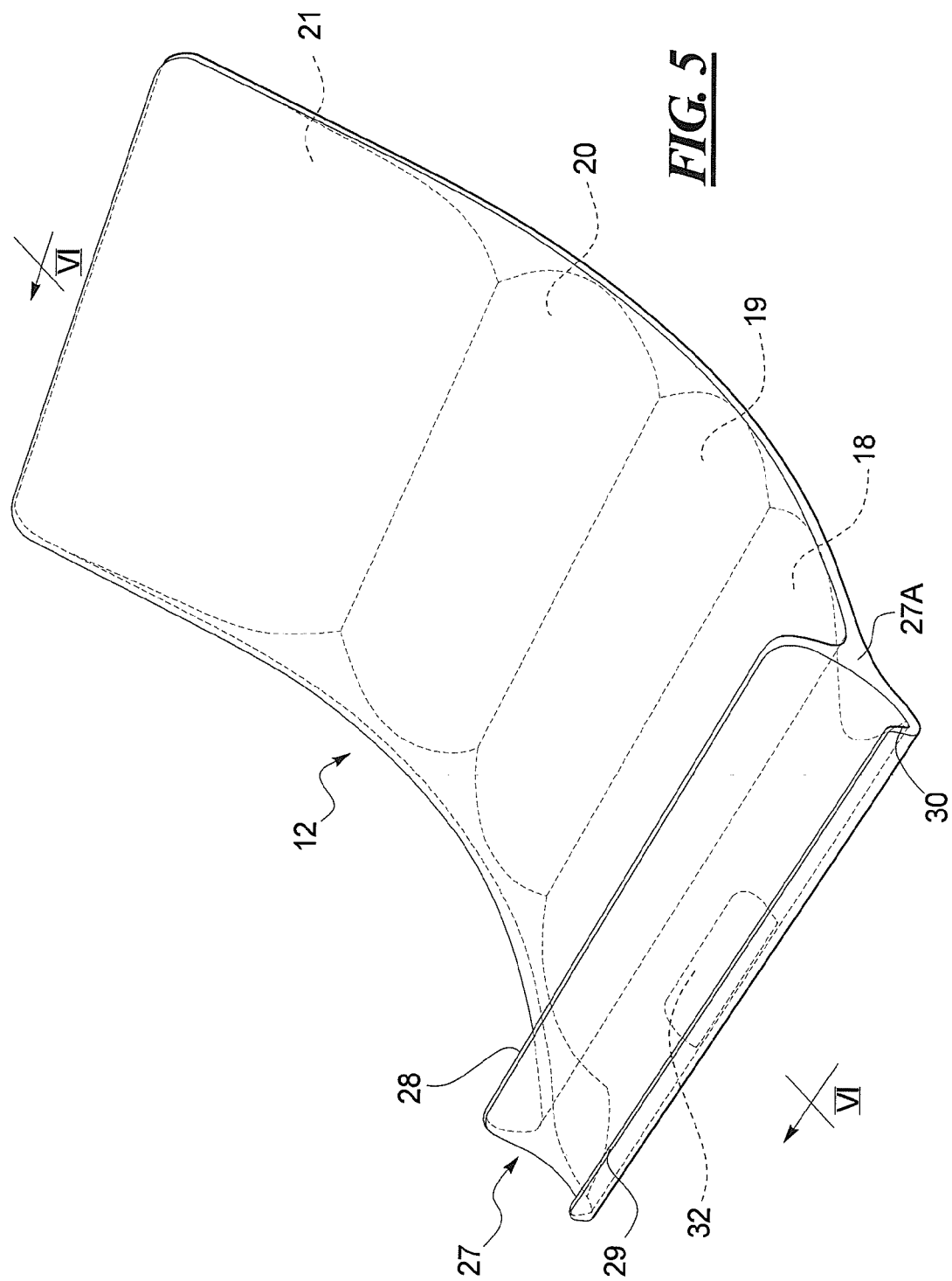
FIG. 5 is a perspective view of the four footprint stand.

For the purposes of promoting an understanding of the principles of the invention, reference will now be made to preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included.

Three different preferred exemplary embodiments of the tablet computer stand are shown in FIGS. 1A/1B, 2A/2B, and 3A/3B at 10, 11, and 12 respectively. The phrase "tablet computer" is inclusive of all tablet-like devices including smart phone like devices. A functional principle of the tablet stand is based on a one-piece body characterized by various non-parallel footprints 13 and 14 in FIG. 1A; 15, 16 and 17 in FIG. 2A; and 18, 19, 20, and 21 in FIG. 3A. In these figures a computer shaped as a tablet 22 resting on a stand is shown in a vertical position. The same stand is shown in FIGS. 1B, 2B, and 3B but with the tablet shown in a horizontal position 22'. The footprints are arranged in such a way that a common center of gravity 23A, 23B, 23C for the tablet 22 in the vertical position or 24A, 24B, 24C for the tablet 22 in the horizontal position on the respective stand is intersected by corresponding vertical projection lines from the respective footprints. In this regard see vertical projection lines 50 and 51 in FIG. 1A; 53 and 54 in FIG. 1B; 56, 57, and 58 in FIG. 2A; 60, 61, and 62 in FIG. 2B; 64, 65, 66, and 67 in FIG. 3A; and 69, 70, 71, and 72 in FIG. 3B. These vertical projection lines indicate a direction of gravity force for each respective footprint when that respective footprint is lying on a flat horizontal surface. Furthermore note that the center of gravity of the respective tablet, the common center of gravity, and the center of gravity of the respective stand lie along a common straight line. In this regard see common line 52 in FIG. 1A; 55 in FIG. 1B; 59 in FIG. 2A; 63 in FIG. 2B; 68 in FIG. 3A; and 73 in FIG. 3B. Further note the respective stand center of gravities 25A in FIG. 1A and FIG. 1B; 25B in FIG. 2A and FIG. 2B; and 25C in FIG. 3A and FIG. 3B.

The radial distribution of the footprints around the respective center of gravity 23A, 23B, 23C or 24A, 24B, 24C of the respective tablets combined with the respective stand allows the user to change the viewing angle of the tablet 22 or 22' just by tilting it from one footprint to the next. As shown in FIGS. 1A/1B, two footprints 13 and 14 are shown. In FIGS. 2A/2B, three footprints 15, 16, and 17 are shown. In FIG. 3A/3B, four footprints 18, 19, 20, and 21 are shown. The tablet in the vertical 22 or horizontal 22' position always stays balanced and stable.

Note that in all drawing figures reference numeral 1 is the center of gravity of the tablet in the vertical 22 and horizontal 22' positions.

As the touch screens of the computer tablets only need to be touched and not to be pressed, there are thus only small forces which are perpendicular to a plane of the screen and thus applied to the tablet and which do not endanger the stable position of the stand 10, 11, or 12.

However, minimum angles between a stable position on one of the footprints and an angle when the stand starts to tilt to the next or previous footprint are predefined in the following way as shown in FIGS. 4A and 4B:

in FIG. 4B angle B is a minimum of 5° for tilting towards the viewer; and in FIG. 4A angle A is a minimum of 10° for tilting away from the viewer.

These angles A and B are determined empirically for an adequate use of the stand. The minimum angle for titling away from the viewer is higher because the forces acting on the tablet by the user's finger tapping on the screen which are perpendicular the plane of the screen have to be compensated for. See FIGS. 4A and 4B.

Describing the above in more detail, see in FIG. 4A for the tablet 22 in a vertical configuration the angles A between the respective perpendicular projection lines 64, 65, 66 and 67 from the respective footprints and the lines 74, 75, and 76 (line 77 is not at an intersection of two adjacent footprints) running between the intersection of respective adjacent footprints and the common center of gravity 23C. Also see in FIG. 4B the angles B between the respective perpendicular projection lines from 69, 70, 71, and 72 from the respective footprints and the lines 78, 79, and 80 running between the intersection of the respective adjacent footprints and the common center of gravity 24C.

Increasing a weight of the stand (either by thickness or by a specific weight of the material of the stand) displaces the common center of gravity 23A, 23B, 23C, or 24A, 24B, and 24C towards the stand (towards a respective center of gravity 25A, 25B, 25C of the stand) which makes a distance between the common center of gravity of the tablet and the stand and the footprints smaller. This is a way to reduce a total size of the stand.

As the tablets are made for horizontal and vertical use (common center of gravity 23A, 23B, 23C in FIGS. 1A, 2A, and 3A; or 24A, 24B, and 24C in FIGS. 1B, 2B, and 3B) the footprints are thus arranged such that they work to provide stabilization for all three different two footprint, three footprint, and four footprint formats shown in FIGS. 1A, 2A, and 3A.

The number of footprints is at least two or more to offer different viewing angle settings as shown in FIGS. 1A/1B, 2A/2B, and 3A/3B.

The stand is made of one piece and therefore easy to produce, is damage resistant, reliable, and wearless.

The plurality of footprints in combination offers a very good stand to position the tablet on both soft grounds like feather beds, duvets, pillows, or couches 26 such as shown in FIGS. 9A and 9B. This makes the stand work very well for use in bed or on a fold lying on the couch. As the common center of gravity 23C or 24C of the tablet and the stand is in the center of the arched surface in a fold such as shown at 26A in a bed or in a couch, it does not tend to tilt and is adjustable in any viewing angle (see FIGS. 9A and 8B). Also note that dot-dashed line 95 in FIG. 9A and the dot-dashed line 96 in FIG. 9B is not necessarily perpendicular to the foot print 19 since the line represents the gravitational force extending down from the common center of gravity 23C when the stand is resting on an arbitrary support surface which is not necessarily horizontal and flat.

Figure 7:
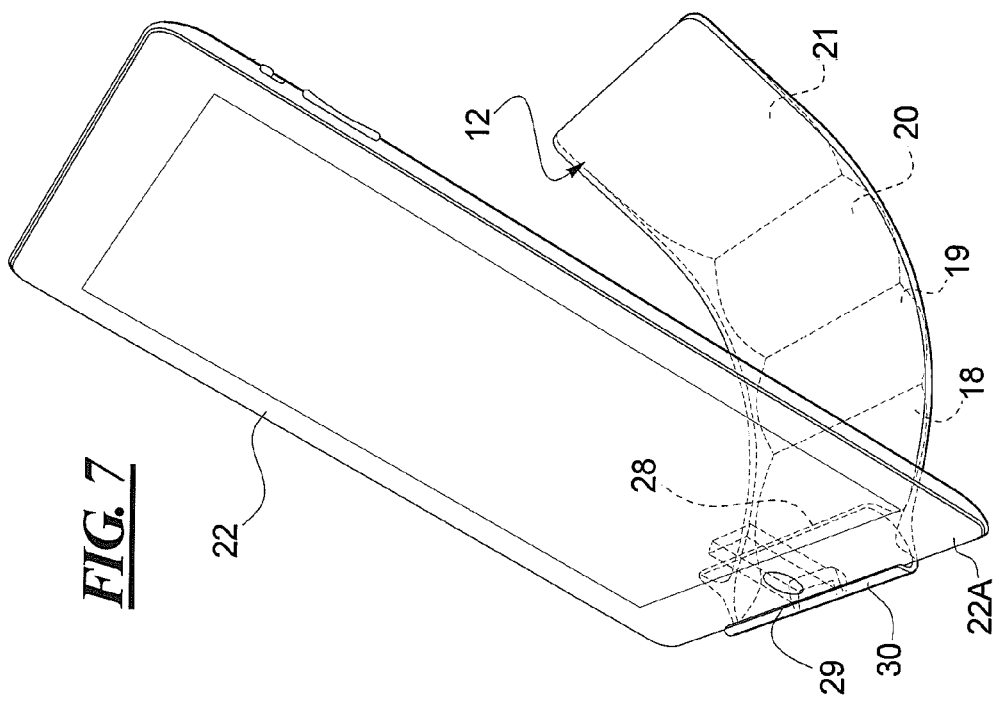
FIG. 7 is a perspective view of the four footprint stand with a vertically positioned tablet.

Referring now particularly to FIG. 5, an inwardly curved surface 27 as a receiving surface for an end 22A of tablet 22 is attached to the first footprint 18 at a mid-point 27A at a back of the curved surface. This curved surface 27 serves as a support and an engagement for the tablet bottom end 22A (FIG. 3A and FIG. 7) of the tablet 22. The curved receiving surface 27 thus has a backrest edge 28 and a front edge 29 at an upper end of an upwardly turned lip 30.

Thus fixation of the tablet occurs by canting the tablet between the front edge 29 and lip 30, and the back edge 28. Also as may be seen in FIG. 1A and FIG. 8 the curved surface 27 can have a curvature approximately matching a bottom curvature of bottom end 22A of the tablet 22 (see FIG. 1A and FIGS. 7 and 8).

Methods for clamping or simply placing the tablet on a supporting surface (80 in all drawing figures showing a flat surface) can be possible as well. Additionally the tablet can be temporarily fixed with magnetic devices or suction devices like a micro-suction foam or a suction cup tape fitted to the curved surface 27 such as shown in dash lines at 75 in FIG. 6. With such a magnetic device, a micro-suction foam, or a suction cup tape the stand sticks to the tablet when lifting it up and carrying it around.

It is also possible that the stand can be fixed or even incorporated onto tablets.

Figure 6:
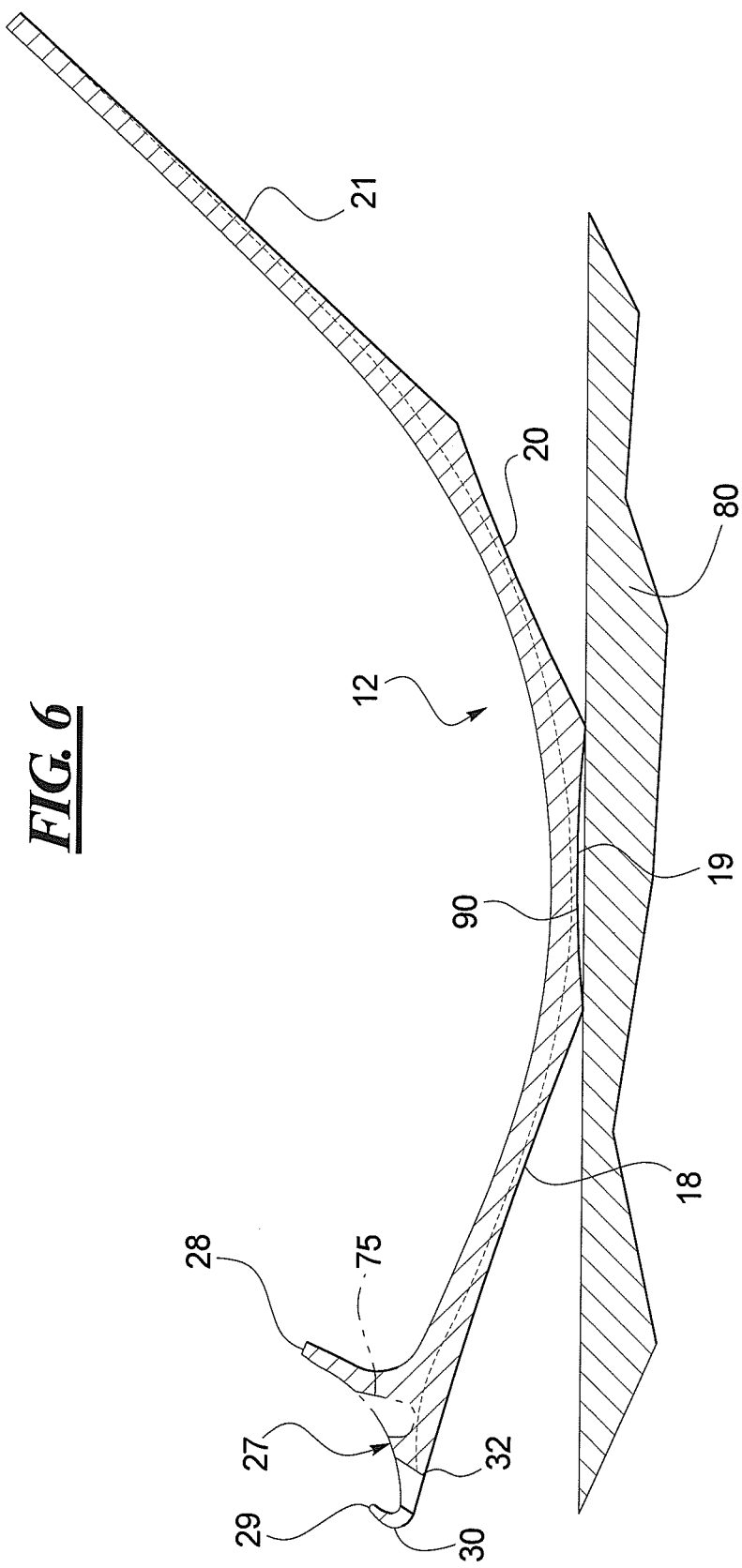
FIG. 6 is a cross-sectional view of the four footprint stand taken along section line VI-VI in FIG. 5.

The footprints such as shown at 18, 19, 20, and 21 are preferably slightly concavely curved as shown at 90 in FIG. 6 to minimize tilting by unevenness of the table top or items resting on the table top or surface 80 such as crumbs or the like.

As shown in FIG. 5 an opening 32 for a plug allows the plug in a data and electricity cable to be passed through to the tablet while the tablet is positioned vertically in the stand.

Figure 8:
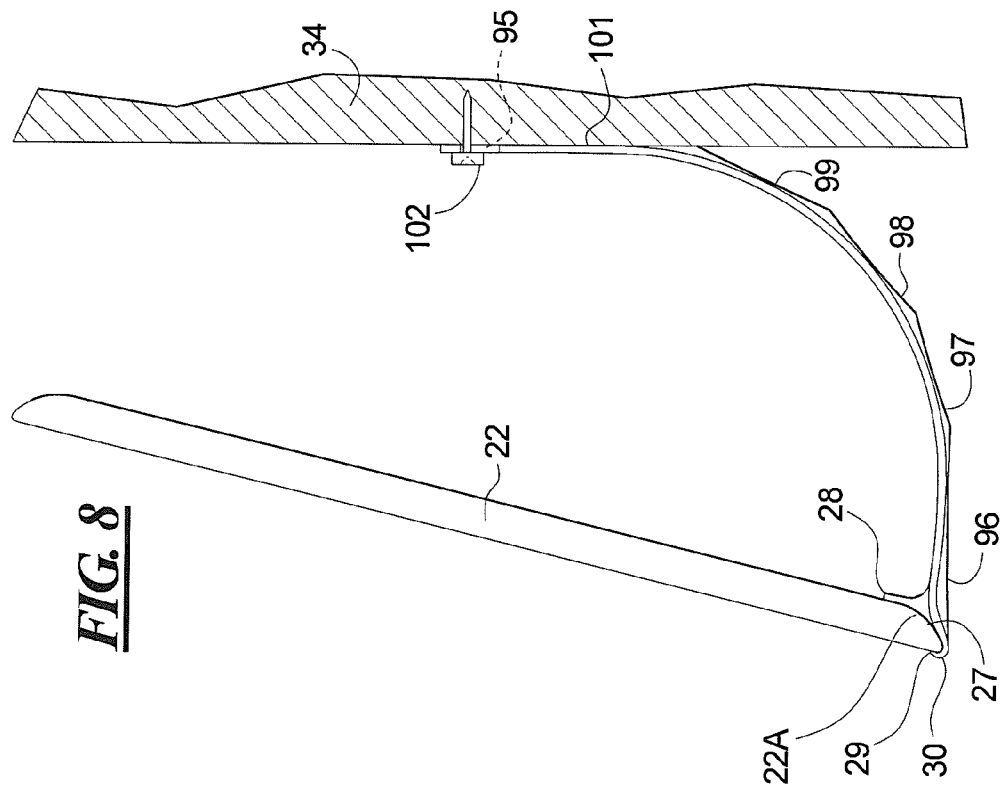
FIG. 8 is a side view of a four footprint stand with a wall mount section.

As shown in FIG. 8, an opening 95 may be provided in an attachment section 101 for an attachment screw 102 in a version of the stand having four footprints 96, 97, 98, 99 for mounting to a wall 34.

As shown most clearly in FIG. 6, the last footprint 21 in the four footprint version is long enough compared to the intermediate footprints 19 and 20, for example, to prevent the stand 12 from rolling backward and the tablet falling down by unexpected horizontal forces.

Figure 13A:
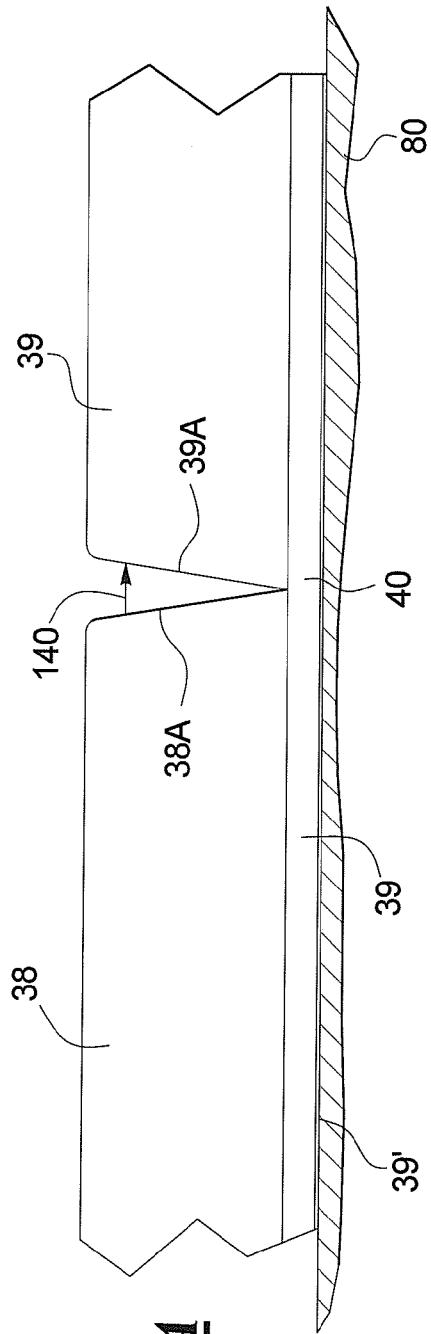
FIG. 13A is a cross-sectional view taken along a sectional line XIIIA-XIIIA in FIG. 11 with adjacent footprints horizontally aligned and showing an articulation connection.
Figure 13B:
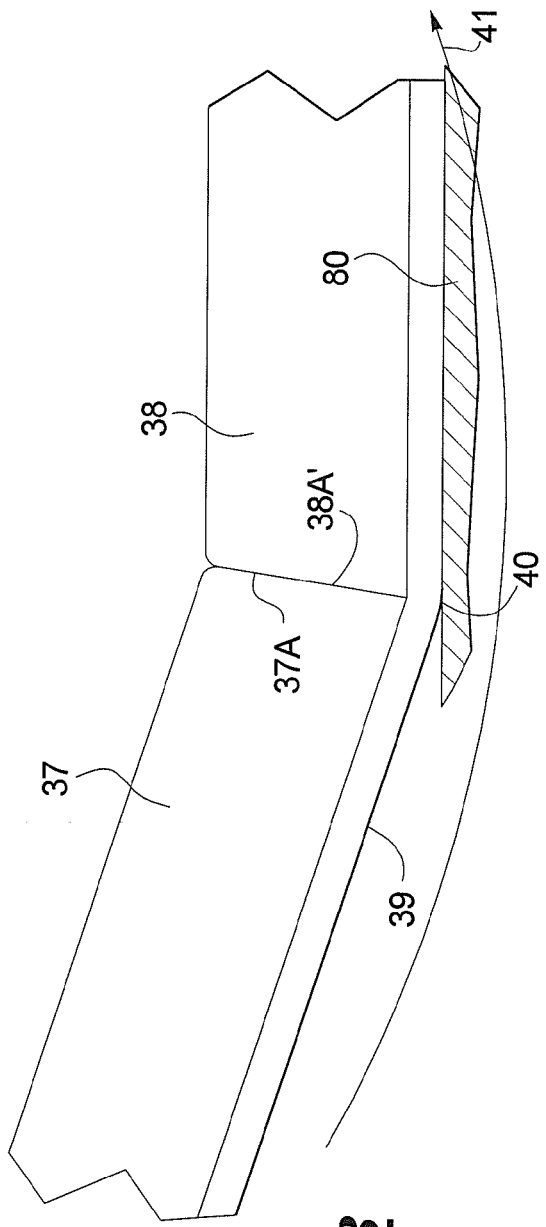
FIG. 13B is a cross-sectional view taken along a sectional line XIIIB-XIIIB in FIG. 11 of the articulation shown with adjacent footprints at an angle to one another.

An important variation of the stand with the same functional principal is a stand shown at 36 attached to the computer tablet 22 with the same functional principal as the stand shown previously but which also serves as a cover for a screen on a front of the computer tablet 22. Here different rigid boards such as 37, 38, 39, and 40 shown in FIGS. 10, 11, and 12 function as the footprints in a four footprint embodiment, for example. Here the different boards such as 37 and 38 as shown in FIGS. 13A and 13B are tied together by a strong fabric 39 which works as a flexible articulation at 40 between the boards 38 and 39 (see FIG. 13A), for example. Where the boards come together the articulation is braced and the load bearing structure works again as one stiff piece as shown in FIGS. 10, 11 and 12.

In FIG. 10 the cover is folded over in front of the screen of the tablet 22. In FIGS. 11 and 12 the cover has been deployed after folding around as shown by the circular arrow at 41 to provide the different footprints.

The thickness of the boards provides rigidity and also an abutment surface as shown at 38A, 39A in FIG. 13A, and 37A and 38A' in FIG. 13B. As illustrated in FIG. 13A, when the boards are in line with each other on flat surface 80, a gap 40 is provided between the abutment surfaces. However as shown in FIG. 13B, when the boards 37 and 38 are at an angle to each other, the abutment surfaces 37A and 38A' abut and provide the rigidity when the stand is resting on the respective footprint 38 such as shown in FIG. 11 and FIG. 13B on the surface 80. The strong fabric 39 may be covered with a soft fabric such as 39' shown in dashed lines in FIG. 13A to protect the tablet screen when the cover is closed against the tablet screen.

Fixation of the cover to the tablet is achieved by clamping the tablet between two metallic blades 42 and 43 as shown in FIGS. 10 and 11 most clearly. This can be accomplished with a soft and sticky surface on an inside (for example rubber). Also other ways of fixation can be employed.

It may thus be appreciated that the stand functioning as a cover has a same functional principal like the one-piece stand shown in FIGS. 1A, 2A, and 3A.

The material employed for the stand has importance since different material characteristics can have an influence on function, geometry, and design.

Specific weight has an influence on a position of the common center of gravity 23A, 23B, 23C, or 24A, 24B, 24C in respective FIGS. 1A/2A/3A and 1B/2B/3B and consequently on a distance between the common center of gravity and footprint (the radius of the sectional arc) respectively on the size of the stand. A lighter specific weight leads to a bigger radius, and a heavy specific weight leads to a smaller radius and therefore a small stand.

A modulus of elasticity of the material has an important influence on a stiffness of the stand. Stiffness is important to keep vibrations as small as possible and therefore keep the tablet stable.

Characteristics in combination with methods of manufacture make synthetic materials like thermosets (phenolic resin or melamin, for example) and also thermoplasts with high modulus elasticity like polycarbonate a preferred choice for the stand.

For esthetic reasons hardwood types or ceramic materials are also possible.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

I claim as my invention:

1. A tablet computer stand for supporting a computer shaped as a tablet on a substantially horizontal support surface, comprising: at least first and second footprints each defining a stand resting surface when placed on said support surface and rigidly and non-bendably joined at an angle, said first and second footprints joined at said angle comprising a one-piece rigid body, and at a front end of the first footprint a receiving surface receiving an end of the tablet to support the tablet on the stand; and the footprints being dimensioned and positioned relative to the tablet end receiving surface such that the stand with the tablet thereon is stable on either the first or the second footprints resting by gravity only, without the use of mechanical fasteners, on said substantially horizontal support surface, and wherein said receiving surface comprises a lip at a bottom end and an edge at a top end.

2. The stand of claim 1 wherein the first footprint has a first perpendicular line intersecting therewith, the second footprint has a second perpendicular line intersecting therewith, and the first and the second perpendicular lines intersect at said common center of gravity of the tablet plus the stand.

3. The stand of claim 1 wherein the first footprint has a first perpendicular line intersecting therewith, the second footprint has a second perpendicular line intersecting therewith, and the first and the second perpendicular lines intersect at a common center of gravity of the tablet plus the stand.

4. The stand of claim 1 wherein the tablet is rectangular with shorter and longer sides and has a vertical position with the longer sides sloped upwardly and a horizontal position with the longer sides extending horizontally, and with the tablet on the stand in the vertical position and a common center of gravity of the tablet plus the stand being defined, and wherein a perpendicular line intersecting with the first footprint passes through the common center of gravity and another line extending from a point where the first and second footprints meet at said angle also passes through the common center of gravity, a minimum angle between said perpendicular line and said another line is ten degrees.

5. The stand of claim 1 wherein the tablet is rectangular with shorter and longer sides and has a vertical position with the longer sides extending upwardly and a horizontal position with the longer sides extending horizontally, and with the tablet on the stand in a horizontal position and a common center of gravity of the tablet plus the stand being defined, and wherein a perpendicular line intersecting with the second footprint passes through the common center of gravity and another line extending from a point where the first and second footprints meet at said angle also passes through the common center of gravity, a minimum angle between said perpendicular line and said another line is five degrees.

6. The stand of claim 1 wherein at least three footprints are provided and wherein a first angle is defined between the first and second footprints and a second angle is also defined between the second and third footprints.

7. The stand of claim 1 wherein at least four footprints are provided and a first angle is provided between the first and second footprints, a second angle is provided between the second and third footprints, and a third angle is provided between the third and fourth footprints.

8. The stand of claim 1 wherein each footprint has a rectangular shape when viewed from above the footprint resting on said support surface.

9. The stand of claim 1 wherein said receiving surface further comprises a curved surface between said lip and said edge.

10. The stand of claim 1 wherein said receiving surface has an attachment element on a portion of said receiving surface for attachment to said tablet.

11. The stand of claim 10 wherein said attachment element comprises a magnetic device or a suction device, said suction device comprising a suction foam or a suction cup tape.

12. The stand of claim 1 wherein said receiving surface has an aperture therein for allowing a plug to be passed there through for plugging into said tablet.

13. The stand of claim 1 wherein said footprints each have top and bottom parallel planar surfaces.

14. The stand of claim 1 wherein said footprints each have a slightly concave shape at a bottom surface for resting on said support surface.

15. The stand of claim 1 wherein said one-piece rigid body comprises plastic.

16. The stand of claim 1 wherein the one-piece rigid body allows a change of viewing angle.

17. The stand of claim 1 wherein the stand is stable with respect to the tablet and moves with the tablet and changes its position and angle with respect to said support surface.

18. The stand of claim 1 wherein the receiving surface edge directly contacts a portion of the tablet when the tablet is on the stand.

19. A tablet computer stand for supporting a computer shaped as a tablet on a substantially horizontal support surface, comprising: at least first and second footprints each defining a stand resting surface when placed on said support surface and rigidly and non-bendably joined at a fixed angle, said first and second footprints joined at said angle comprising a one-piece rigid body, and at a front end of the first footprint a receiving surface receiving an end of the tablet to support the tablet on the stand, said receiving surface comprising a curved surface having an upper edge and a lip at a lower edge, said lip engaging said end of the tablet; and the footprints being dimensioned and positioned relative to the tablet end receiving surface such that the stand with the tablet thereon is stable on either the first footprint or the second footprints resting by gravity only, without the use of mechanical fasteners, on said substantially horizontal support surface, and wherein said receiving surface comprises a lip at a bottom end and an edge at a top end.

20. The stand of claim 19 wherein the receiving surface edge directly contacts a portion of the tablet when the tablet is on the stand.

21. A tablet computer stand system for resting on a substantially horizontal support surface, comprising: a computer shaped as a rectangular tablet having long sides and short sides, in a vertical position of the tablet the long sides sloping upwardly and in a horizontal position of the tablet the short sides extending horizontally; at least first and second footprints each defining a stand resting surface when placed on said support surface and rigidly and non-bendably joined at an angle, said first and second footprints joined at said angle comprising a one-piece rigid body, and at a front end of the first footprint a receiving surface receiving an end of said tablet to support the tablet on the stand; and the footprints being dimensioned and positioned relative to the receiving tablet surface such that the stand with the tablet thereon is either the vertical or horizontal positions is stable on either the first footprint or the second footprints resting by gravity only, without the use of mechanical fasteners, on said support surface, and wherein said receiving surface comprises a lip at a bottom end and an edge at a top end.

22. The stand system of claim 21 wherein the first footprint has a first perpendicular line intersecting therewith, the second footprint has a second perpendicular line intersecting therewith, and the first and the second perpendicular lines intersect at a common center of gravity of the tablet plus the stand.

23. The stand of claim 21 wherein the receiving surface edge directly contacts a portion of the tablet.

\* \* \* \* \*